(12) United States Patent
Brann et al.

(10) Patent No.: US 7,536,343 B2
(45) Date of Patent: May 19, 2009

(54) PROTOCOL-INDEPENDENT ASSET TRADING SYSTEM AND METHODS

(75) Inventors: John Edwin Thomas Brann, Hartsdale, NY (US); Neill Penney, Surrey (GB)

(73) Assignee: FX Alliance, LLC, New York, NY (US)

( * ) Notice: Subject to any disclaimer, the term of this patent is extended or adjusted under 35 U.S.C. 154(b) by 657 days.

(21) Appl. No.: 10/996,603

(22) Filed: Nov. 26, 2004

(65) Prior Publication Data

US 2005/0137960 A1    Jun. 23, 2005

Related U.S. Application Data

(60) Provisional application No. 60/558,578, filed on Apr. 2, 2004, provisional application No. 60/524,841, filed on Nov. 26, 2003.

(51) Int. Cl.
G06Q 40/00    (2006.01)
(52) U.S. Cl. ........................................ 705/37
(58) Field of Classification Search .................. 705/37
See application file for complete search history.

(56) References Cited

U.S. PATENT DOCUMENTS

| 4,677,552 A | 6/1987 | Sibley, Jr. |
| 4,903,201 A | 2/1990 | Wagner |
| 4,949,248 A | 8/1990 | Caro |
| 5,077,665 A | 12/1991 | Silverman et al. |
| 5,136,501 A | 8/1992 | Silverman et al. |
| 5,258,908 A | 11/1993 | Hartheimer et al. |
| 5,262,942 A | 11/1993 | Earle |
| 5,375,055 A | 12/1994 | Togher et al. |
| 5,758,328 A | 5/1998 | Giovannoli |
| 5,761,386 A | 6/1998 | Lawrence et al. |
| 5,787,402 A | 7/1998 | Potter et al. |

(Continued)

FOREIGN PATENT DOCUMENTS

WO    WO-03019436    3/2003

OTHER PUBLICATIONS

Addison, E.R., "Using news understandings and neural networks in foreign currency options trading," available at http://ieeexplore.ieee.org/search97/s97is.vts? cti n= iew& dk gwKey=http%3A%2 %2j . . . . (Aug. 27, 2001) Abstract.

(Continued)

Primary Examiner—Charles R Kyle
Assistant Examiner—David L Wood
(74) Attorney, Agent, or Firm—Grady L. White; Law Offices of Grady L. White, LLC

(57) ABSTRACT

Systems and methods for executing trades on an interconnected computer network, such as the Internet, using a catalog of protocol-independent fundamental asset trading messages, called "gestures," that support multiple higher-level trading protocols which characterize most asset trading transactions. Trading transactions requiring protocol-dependent workflows are composed from protocol-independent gestures selected from the catalogue of gestures and then passed one at a time to an online asset trading server. The online asset trading server transitions pending quotes and trades through a series of distinct states, based on the current state, the selected protocol-independent gestures it receives and a set of state transition rules, thereby implementing the higher-level protocol-dependent workflows.

43 Claims, 11 Drawing Sheets

U.S. PATENT DOCUMENTS

| | | | |
|---|---|---|---|
| 5,794,234 | A | 8/1998 | Church |
| 5,819,237 | A | 10/1998 | Garman |
| 5,855,008 | A | 12/1998 | Goldhaber et al. |
| 5,890,140 | A | 3/1999 | Clark et al. |
| 5,897,621 | A | 4/1999 | Boesch et al. |
| 5,924,082 | A | 7/1999 | Silverman et al. |
| 5,924,083 | A | 7/1999 | Silverman et al. |
| 5,963,923 | A | 10/1999 | Garber |
| 5,978,485 | A | 11/1999 | Rosen |
| 6,014,627 | A | 1/2000 | Togher et al. |
| 6,016,483 | A | 1/2000 | Rickard et al. |
| 6,029,146 | A | 2/2000 | Hawkins et al. |
| 6,058,378 | A | 5/2000 | Clark et al. |
| 6,088,685 | A | 7/2000 | Kiron |
| 6,134,535 | A | 10/2000 | Belzberg |
| 6,141,653 | A | 10/2000 | Conklin et al. |
| 6,205,433 | B1 | 3/2001 | Boesch et al. |
| 6,247,000 | B1 | 6/2001 | Hawkins et al. |
| 6,260,025 | B1 | 7/2001 | Silverman et al. |
| 6,278,982 | B1 | 8/2001 | Korhammer et al. |
| 6,285,989 | B1 * | 9/2001 | Shoham .................. 705/37 |
| 6,304,858 | B1 | 10/2001 | Mosler et al. |
| 6,408,282 | B1 | 6/2002 | Buist |
| 6,421,653 | B1 | 7/2002 | May |
| 6,560,580 | B1 | 5/2003 | Fraser et al. |
| 6,629,081 | B1 | 9/2003 | Cornelius et al. |
| 6,766,304 | B2 | 7/2004 | Kemp, II et al. |
| 6,772,132 | B1 | 8/2004 | Kemp, II et al. |
| 6,807,635 | B1 | 10/2004 | Kleckner |
| 6,845,507 | B2 * | 1/2005 | Kenton .................. 719/314 |
| 7,379,909 | B1 * | 5/2008 | Cruz et al. .................. 705/35 |
| 2001/0044771 | A1 | 11/2001 | Usher |
| 2002/0091624 | A1 | 7/2002 | Glodjo et al. |
| 2003/0069836 | A1 | 4/2003 | Penney |
| 2003/0101128 | A1 * | 5/2003 | Abernethy .................. 705/37 |
| 2003/0126063 | A1 * | 7/2003 | Reuter et al. .................. 705/37 |
| 2003/0139997 | A1 | 7/2003 | Ginsberg |
| 2003/0149653 | A1 | 8/2003 | Penney |
| 2004/0034591 | A1 * | 2/2004 | Waelbroeck et al. .......... 705/37 |
| 2004/0039689 | A1 | 2/2004 | Penney |
| 2004/0143539 | A1 | 7/2004 | Penney |

OTHER PUBLICATIONS

Galileo International Introduces New Viewpoint (TM) Software, PR Newswire, p. 01651 (3 pages) (Nov. 9, 1999).

Going with the flow, banking technology online, available at http://www.bankingtech.com/online/features/2001/m y.html (Aug. 28, 2001).

Instant Web Trading available at http://www.cognotec.com/service/index.html (Aug. 11, 2003).

Izumi, K. et al., "An articicial market analysis of exchange rate dynamics," Evolutionary Programming V. Proceedings of the Fifth Annual Conference on Evolutionary Programming, p. 27-36 (1996) (Abstract).

Kaizoji, Taisei, "A Synergetic Approach to Speculative Price Volatility," SAC '99, p. 57-65 (1998).

Kim, Lau Sim, "Towards an intelligent Boss," Proceedings of the First Singapore International Conference on Intelligent Systems (SPICIS '92), p. 313-17 (1992) (Abstract).

Klopfenstein, G., "A random walk in chaos," Banking Technology, 10(5): 26-8, (Jun. 1993) (Abstract).

O'Callaghan, D., "Straight Through to the Portal [foreign exchange trading]," Banking Technology, 18(4): 36-40 (May 2001), Abstract.

Parikh, Satu S. et al., "Electronic futures markets versus floor trading: Implications for interface design," available at http://www.com.rg/pubs/articles/proceedings/chi/223904/p296-parikh.html (Aug. 27, 2001).

Reuters: Products & Services, Sales & Trading—Treasury available at http://about.reuters.com/productinfo/treasury.asp?seg=1 (Aug. 11, 2003).

Riggs gets the personal touch [bank business operations], Financial Technology Bulletin, 19(3): 4 (Jun. 14, 2001) (Abstract).

Simms, M., "Portfolio vendors promote STP with increasingly open product offerings," Wall Street & Technology suppl. issue, p. 18, 20, 22, 24-5 (Feb. 2001) (Abstract).

www.fxgame.com, FXGame—Currency Trading Game, available at http://fxgame.oanda.com (Aug. 27, 2001).

* cited by examiner

FIG. 1

| | PROVIDER | | | | CUSTOMER | | |
|---|---|---|---|---|---|---|---|
| | Gesture | API Call | Sent/Received | Simple Description | Gesture | API Call | sent/received | Simple Description |
| 1 | Request Quote | OnQuoteRequest() | received | Request Start of Quote Stream | Request Quote | SubmitDeal() | sent | Request Start of Quote Stream |
| 2 | | | | | AddProvider | NewProvider() | sent | Add a provider to an existing Quote Stream |
| 3 | | | | | Remove Provider | RemoveProvider() | sent | Remove a provider from an existing quote stream |
| 4 | Inclined to Quote | SendPickup() | sent | Declare intent to quote | Inclined to Quote | OnDealPickup() | received | Declare intent to quote |
| 5 | Quote | SendQuote() | sent | a Quote | Quote | OnNewPrice() | received | a Quote |
| 6 | Quote Ack | OnQuoteAck() | received | Quote received | | | | |
| 7 | Quote Withdrawn | SendWithdrawQuote() | sent | Notice of Quote expiry | Quote Withdrawn | OnWithdrawPrice() | received | Notice of Quote expiry |
| 8 | Quote Denied | SendAbortQuote() | sent | Refusal to quote | Quote Denied | OnQuoteDenied() | received | Refusal to quote |
| 9 | Terminate Protocol | OnQuoteRequestWithdraw() | received | The whole protocol ends. | Terminate Protocol | NothingDone() | sent | Done with whole trade |
| 10 | | | | | Quote Terminated | OnQuoteTerminated() | received | Quote Stream ended |
| 11 | Offer to Deal | OnDealRequest() | sent | Terms offered | Offer to Deal | AcceptDeal() | sent | Terms offered |
| 12 | Accept Terms | SendAcceptTerms() | sent | Terms accepted, deal not yet executed | Accept Terms | OnDealAccepted() | received | Terms accepted, deal not yet executed. Only sent AFTER the server has successfully logged the terms |
| 13 | Terms Logged | OnAcceptTermsAck() | received | Accepted terms logged at Server | | | | |
| 14 | Deal Executed | SendAcceptDeal() | sent | Deal executed | | | | |
| 15 | Terms Rejected | SendRejectDeal() | sent | Terms rejected | | | | |
| 16 | Deal Done | OnDealCompletion(true) | received | Deal Done at Server | Deal Done | OnDealLogged() | received | Deal Done at Server |
| 17 | Deal not Done | OnDealCompletion(false) | received | Deal Not Done at Server | Deal not Done | OnDealLogError() | received | Deal Not Done at Server |
| 18 | | | | | Timer Alert | OnDealExpired() | received | Deal execution is taking an unexpectedly long time. May indicate a problem. |

PROTOCOL-INDEPENDENT ASSET TRADING SYSTEM AND METHODS

CROSS-REFERENCE TO RELATED APPLICATION

This application is related to and claims priority under 35 U.S.C. § 119 to provisional application No. 60/524,841, filed Nov. 26, 2003, and provisional application No. 60/558,578, filed Apr. 2, 2004, which are both incorporated into this application in their entirety by this reference.

FIELD OF ART

The present invention relates generally to automated online asset trading systems and more particularly to automated online asset trading systems where counterparties use high-level computer software application programs, application programming interfaces and graphical user interfaces to initiate, negotiate and execute asset trading transactions with support from or under the control of an intermediate or centralized online trading server.

RELATED ART

In the asset trading business, including for example the foreign exchange ("FX") and money markets, customers execute trades through asset dealers (typically, banks or banking institutions), who are referred to as "liquidity providers," or simply "providers." In a typical scenario, a customer wishing to buy, sell, lend or borrow some quantity of assets proposes a trading transaction by sending a request for price quotes (referred to as an "RFQ") to one or more of the providers. The providers respond by returning price quotes for the proposed transaction, which indicate the prices the providers are willing to buy (or borrow) the assets, as well as the prices they are willing to sell (or lend) the assets. If a customer likes a price quote and wishes to enter into a deal with the sending provider, then the customer transmits to the provider an offer to trade assets for the price stated in the price quote (the offer is typically referred to as an "offer to deal"). If the price quote is still available (i.e., not expired) when the provider receives the customer's offer to deal, and the provider can meet other terms in the RFQ, such as the quantity ordered and the proposed settlement date, then the provider typically accepts the offer to deal, and the proposed transaction is booked and executed. In a slightly different scenario, providers may stream price quotes to customers on a substantially continuous basis without receiving a specific RFQ for price quotes, and customers may initiate a transaction by sending an offer to deal against one or more price quotes within the stream.

Automated asset trading systems have been introduced to facilitate faster, more efficient and, for auditing purposes, more traceable, trading transactions between customers and providers. Typically, these systems comprise a high-level trading application program (or, in some instances, a suite of high-level trading application programs) or graphical user interface running on a customer's computer system (or network), which receives input from the user and sends electronic trading instructions to one or more high-level trading application programs running on the providers' computer systems (or networks). The customer's computer system and the providers' computer systems talk to each other by exchanging a series of messages via one or more data communication channels established within an interconnected computer network, such as the Internet, a dedicated wide area network (WAN), or a corporate intranet. Typically, the high-level trading application programs and graphical user interfaces create messages and transmit them over the computer network by accessing a predefined collection or library of subroutines and function calls. The collection or library of subroutines and function calls is referred to as an application programming interface ("API").

With the help of the APIs, the messages carrying quotes and trading instructions over the data communications links in the computer network may be channeled through an intermediate or centralized online trading server (or "portal"), which is also connected to the interconnected computer network. Typically, the intermediate online trading server is configured to coordinate, compare, match, error-check and/or log the messages on behalf of the customers and liquidity providers and communicate responses to the parties in real-time. In some cases, the online trading server is managed and operated by a third party. FX Alliance, LLC of New York, N.Y. (FXall) is one example of a third party operator of an online trading server for the FX market.

Existing trading application programs often include graphical or text-based user interfaces configured to display to users a significant amount of data associated with trading transactions (such as bid and offer prices, asset quantities, proposed settlement dates, trading protocols, trading accounts, etc.) and to receive from the users specific trading instructions and selections responsive to the displayed data. The instructions and selections are typically generated through the use and manipulation of personal computer input devices well-known in the computer arts, such as, for example, keyboards, computer mice, trackballs, graphic tablets and stylus pens.

In the asset trading business, there is a tremendous amount of pressure to improve, expand, upgrade and/or repair products and services associated with online asset trading systems, particularly with respect to the number and complexity of an ever-increasing number of trading protocols that must be supported. To meet customer expectations and remain competitive, operators and managers of online trading systems and online trading portals, as well as application software developers and programmers, must develop and roll out new and improved software on a fairly frequent basis. Due primarily to the large number of interrelated and cooperating software programs and modules that may be adversely affected by a significant change to any particular program or module, however, it has been found that a substantial amount of time, effort and resources are required to release an improvement, upgrade or fix. Changing or replacing an important operating component (e.g., processor, algorithm or software module) on the online trading server to support a new trading protocol, for instance, usually requires changing or replacing all or a significant number of the trading application programs, graphical user interfaces and APIs that reside on and run at the remote customer and provider computer systems which interact with that online trading server. In cases where there are many such remote systems, rolling out a change, improvement or fix for any particular operating component typically requires a tremendous amount of work that must go into installing, testing and re-certifying all of the programs and libraries at the remote sites that are potentially affected by the change, improvement or fix. Moreover, significant changes or improvements to any online trading system usually require expending time and money creating additional or revised training materials and system documentation.

Accordingly, there is a need in the online trading industry for an online trading system or network that incorporates components that, although built to cooperate with each other, still operate somewhat independently so that certain components may be changed, upgraded or fixed without necessarily changing, upgrading or fixing every other component with which the changed, upgraded or fixed component interacts. Such a system would make it much faster, cheaper and easier, for example, for providers, customers and online trading server operators to develop, test and deploy significant new features and upgrades, as well as support new trading protocols as they come online.

SUMMARY OF THE INVENTION

The present invention addresses the above-described need by providing systems and methods for executing trades on an interconnected computer network, such as the Internet, using a defined set (or "catalog") of fundamental asset trading messages that support multiple higher-level trading protocols (i.e., "workflows") that characterize most asset trading transactions, but which operate independently from such protocols. These protocol-independent fundamental asset trading messages are called "gestures." Protocol-dependent workflows for quotes and trades are converted and arranged into a sequence of protocol-independent gestures for the quotes and trades, which gestures are selected from the catalogue of gestures and then passed one at a time to an online asset trading server. The online trading server transitions the pending quotes and trades through a series of distinct states, based on the current state, the selected protocol-independent gestures it receives and a set of state transition rules, thereby implementing the higher-level protocol-dependent workflows. After processing each protocol-independent gesture received from a customer trading system or a provider trading system (and changing the state of the quote or trade, if necessary), the online trading server typically generates a return protocol-independent gesture and transmits the return protocol-independent gesture to one or both of the customer and provider trading systems. In this manner, the online trading server is capable of carrying out a large number of diverse and complex higher-level protocol-dependent transactions in a robust, highly-adaptable and efficient manner.

In general terms, one aspect of the invention provides a computer network for processing trading transactions, comprising a customer trading application running on a customer online trading system, a provider trading application running on a provider trading system, and an online trading server with a trading engine and a memory storage area (such as a "pending quotes and trades" database). The computer network includes a first data communications link connecting the online trading server to the customer trading system; and a second data communications link connecting the online trading server to the provider trading system. The online trading server receives, via the first data communications link, a request from the customer trading system to process a quote or trade according to a particular protocol. Typically, the request is delivered to the online trading server via one or more protocol-independent gestures, as will be described below. The server stores a current state for the quote or trade in the memory storage area, and sends the request (using another protocol-independent gesture) to the provider trading system via the second data communications link.

The provider trading application selects a protocol-dependent workflow for the request, which is a defined sequence of protocol-independent fundamental asset trading instructions, and serially transmits each protocol-independent gesture in the defined sequence to the online trading server. Upon receiving each protocol-independent gesture at the online trading server, the trading engine modifies the memory to reflect a new state for the quote or trade. The new state is determined based on the current state, the protocol-independent gesture received and a state transition rule selected from a collection of state transition rules. In some cases, and for some protocol-independent gestures, the status of the quote or trade does not change, in which case the new state will be the same as the current state. After changing or updating the current state, the online trading server communicates the appropriate confirmations, notices, acknowledgements and other information (such as, for example, specific economic terms for the transaction) back to the customer trading application or back to the provider trading application by generating and transmitting protocol-independent gestures those trading applications expect to receive as part of their workflows. Notably, and as described below, the protocol-dependent workflows and the protocol-independent gestures used by a provider trading application for a certain protocol and those used by a customer trading application for the same protocol may be significantly different from each other.

Another aspect of the invention provides, not a computer network, but an online trading server comprising a network interface, a memory and a trading engine. In this aspect, the network interface receives the request to process a quote or trade according to a particular protocol and sends the request to a remote provider trading system. The memory stores a current state for the quote or trade, and the trading engine receives, via the network interface, a defined sequence of protocol-independent gestures for the quote or trade from the remote provider trading system or the remote customer trading system. Upon receiving each protocol-independent gesture, the trading engine on the online trading server modifies the memory, if necessary, to reflect a new state for the quote or trade based on the current state, each protocol-independent gesture received and a state transition rule.

In yet another aspect of the invention, there is provided a method of processing trading transactions, comprising the steps of: (1) receiving at an online trading server a request from a counterparty to process a quote or trade according to a particular protocol; (2) storing a current state for the quote or trade in a memory at the online trading server; (3) sending the request to an opposite counterparty; (4) on the opposite counterparty system, selecting and/or creating a protocol-dependent workflow for the request, the protocol-dependent workflow comprising a defined sequence of protocol-independent gestures; (5) serially transmitting each protocol-independent gesture in the workflow back to the online trading server; and (7) on the online trading server, modifying the memory to reflect a new state for the quote or trade in response to receiving each protocol-independent gesture. As in the other aspects of the invention, the new state for the quote or trade is determined based on the current state, the particular protocol-independent gesture received and a state transition rule.

The trading protocol-independent aspects of the invention allow and support, for example, development of application programming interface libraries for deployment at customer and (particularly) provider sites that are able to correctly process the gestures, independent of the higher level trading protocols used by the higher-level trading application programs. Thus, the higher-level application programs and libraries may be more easily modified and updated without affecting the surrounding programs.

BRIEF DESCRIPTION OF THE DRAWINGS

The present invention and various aspects, features and advantages thereof are explained in detail below with reference to exemplary and therefore non-limiting embodiments and with the aid of the drawings, which constitute a part of this specification and include depictions of the exemplary embodiments. In these drawings:

FIG. 1 contains two tables showing a catalog of protocol-independent provider and customer gestures (i.e., fundamental asset trading messages) and exemplary corresponding API calls that might be used in one embodiment of the invention.

DETAILED DESCRIPTION OF PREFERRED EMBODIMENTS

Figure 2A:
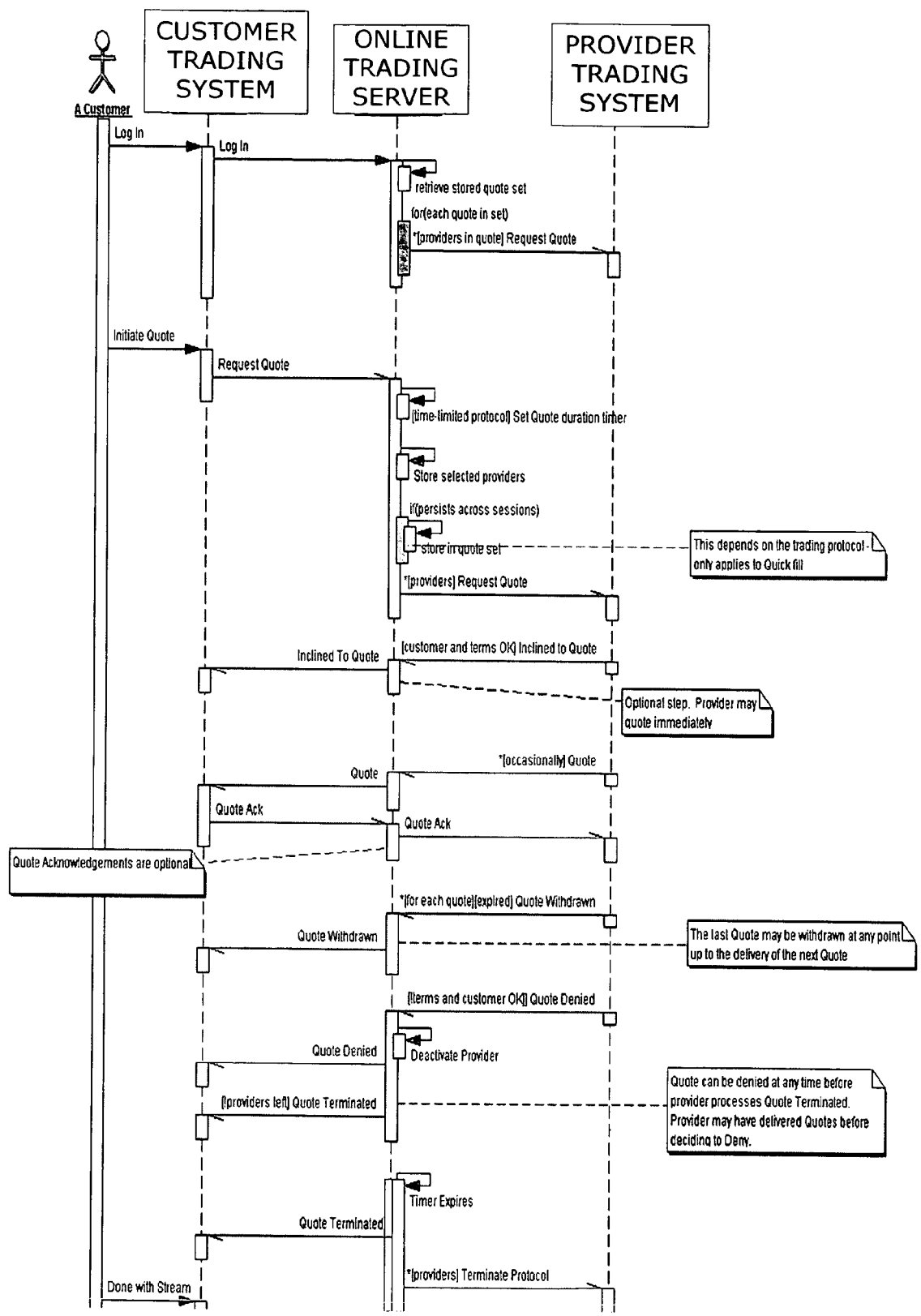
FIGS. 2A, 2B, 3, 4 and 5 contain unified modeling language (UML) sequence diagrams illustrating exemplary protocol-dependent workflows for the RFQ, QuickFIll (i.e., "streaming") and resting order protocols in an embodiment of the invention.

With reference to FIGS. 1 through 10, a detailed discussion of exemplary embodiments of the invention will now be presented. Notably, the invention may be implemented using software, hardware, firmware, or any combination thereof, as would be apparent to those of skill in the art upon reading this disclosure. The technical robustness and performance characteristics of gestures are described in detail below with reference to the FXall multiple-provider asset trading platform. The FXall platform, however, is only one example of a trading platform with which the invention described herein will work. The invention is designed to be equally applicable and operate efficiently with any other single-provider or multiple-provider trading platform. Thus, references in this document and in the drawings to FXall's trading platform and its protocols and components (e.g., "the QuickFill protocol" or "the FXall Server") are for exemplary purposes only and should not be construed to limit the scope and applicability of the present invention.

Application Programming Interfaces (APIs)

In computer networks used for conducting online trading transactions, such as foreign exchange transactions, providers and customers typically use a library of subroutines and function calls to build an interface between their trading system (i.e., "rate engine") and an online trading server. The library typically contains classes concerned with communications (establishing, maintaining and destroying connections to and with the online trading server, and sending and receiving messages over the connection). For example, the typical lifecycle of a provider trading application using an API to communicate with an online server and an opposite customer trading application is as follows:

Start application;
Perform startup housekeeping functions and establish a connection to the online trading server;
Respond to quote, trade and information requests;
Perform shutdown housekeeping functions and close connection to the online trading server.
Shut down application.

Connection Types and Encryption

In embodiments of the present invention, "direct connections" are established using standard TCP/IP sockets, protected by SSL (Secure Sockets Layer). For security reasons, these types of connections may be blocked by an institution's firewall. Where firewall restrictions are in place, direct connections will normally require the removal of a firewall limit or the implementation of a SOCKS proxy before it is possible to establish the connection. Direct connections usually offer the maximum connection performance. Since standard sockets are used, no special data formatting (which increases the size and processing cost of data delivery) is required).

Embodiments of the present invention also support "tunnel connections," which mimic normal World Wide Web ("WWW") traffic. Tunnel connections use TCP/IP over the normal https sockets that are not usually subjected to interdiction by corporate firewalls. The two-way message traffic is encoded in http packets in order to pass through web proxies. The additional program work involved in this encoding, and the additional data it requires means that Tunnel Connections are generally slower than direct connections. Preferably, the data transmitted over a connection are encrypted. The encryption is typically applied by SSL ('Secure Sockets Layer'), as used in the https protocol.

TCP (the network transport underlying https and socket connections over the Internet or virtual private networks) is based on a lower-level packet switching protocol that allows for dropped message packets to be re-transmitted and the route of the connection to be changed without notifying the higher-level application code. This underlying robustness comes with a cost—it takes a finite (often large, measured in minutes) amount of time to detect a broken network connection under some failure conditions. The invention supports a faster detection mechanism for this type of failure. Specifically, online trading servers and APIs of the present invention exchange 'heart-beat' messages. The high-level trading application running on a customer or provider system may not be informed of the delivery of these heartbeat messages, but the underlying API library is configured to detect the non-arrival of scheduled heartbeats and take action before the underlying TCP connection reports that it has broken.

Computer networks of the present invention also use heartbeat messages to measure round-trip latency between the customer and provider trading systems. The latency data for any computer system on the network are gathered and summarized and made available to all of the other computer systems attached to the computer network. These latency data awareness and distribution functions are components of an invention claimed in co-pending application Ser. No. 10/966,612, entitled "LATENCY-AWARE ASSET TRADING SYSTEM," filed on even date herewith, which is assigned to the assignee of the present application and incorporated in its entirety into this application by reference.

Trading Protocols, Workflows and Protocol-Independent Gestures

Trading protocols are "workflows." A workflow defines one or more valid sequences of messages that may flow among parties in a system to complete a trading transaction. Trading application programs usually interact with an online trading server according to the requirements of a trading protocol supported by the online trading server and/or the opposite counterparty. For this reason, APIs also contain classes of subroutines and function calls that model the supported trading protocols. The present invention offers improved systems and methods for implementing a variety of trading protocols that are supported through an API. These protocols define valid workflows for the delivery of quotes and the negotiation of deals, which are expressed as sequences of protocol-independent subroutine and function calls in the API.

Various trading protocols (i.e., "protocol-dependent workflows") are implemented in the invention by defining and using a catalog of fundamental asset trading messages that support but operate independently from these trading protocols. FIG. 1 contains two tables showing an exemplary catalog of protocol-independent gestures that may be combined together in embodiments of the invention to build a variety of workflows. The table on the left side of FIG. 1 shows a collection of protocol-independent gestures (API function calls) that may be used by a provider trading application to exchange messages carrying trading requests and instructions with an online trading server. The provider trading application creates a protocol-dependent provider workflow by arranging the protocol-independent gestures (i.e., API function calls) shown in the table on the left side of FIG. 1 into a sequence dictated by the particular protocol desired for a transaction.

The table on the right side of FIG. 1 shows a collection of protocol-independent gestures (API function calls) that may be used by a customer trading application to exchange messages carrying trading requests and instructions with the online trading server. Similar to the operation of the provider trading application and its use of provider gestures, the customer trading application creates a protocol-dependent customer workflow by arranging the protocol-independent gestures (i.e., API function calls) shown in the table on the right side of FIG. 1 into a sequence dictated by the particular protocol desired for the transaction.

Notably, although the API function calls may be different, there is usually a strong correlation between the provider gestures and customer gestures. This is because the provider gestures and customer gestures are designed to work together like two sides of the same coin. For example, in preferred embodiments of the invention, the APIs on both the provider trading system and the customer trading system include a gesture referred to as the "quote" gesture (see row No. 5 in FIG. 1). The provider trading application invokes the quote gesture by sending a quote to the online trading server by calling the function "SendQuote( )" in the provider API. But the customer trading application invokes the quote gesture when it retrieves that quote from the online trading server by calling the function "OnNewPrice( )" in the customer API. Thus, the provider trading application is using the quote gesture to send data, but the customer trading application is using the quote gesture to receive data.

In some cases, the protocol-dependent sequences created by the provider and customer trading application programs may be created dynamically as trading requests are initiated or received. In other cases, the provider and customer trading application programs may retrieve the desired sequence of gestures from a data store or another application program or process configured to provide workflows for specified protocols. In still other cases, the protocol dependent sequences of protocol-independent gestures for particular protocols may be "hard-coded" into the provider or customer trading applications.

Trading protocols are typically composed of one or two large-scale parts: a quote part and a trade part. The two parts have a limited relationship—when a quote part is present, the trade part can only be initiated while the quote part is active.

With reference now to the unified modeling language (UML) sequence diagrams shown in FIGS. 2A, 2B, 3, 4 and 5, the following sections describe the sequences of protocol-independent gestures that may be used in embodiments of the invention to compose the quote part and various forms of the trade part of several exemplary trading protocols. In these sequence diagrams, the vertical axes represent the passage of time (from top to bottom), and the horizontal axes represent the passing of protocol-independent gestures between the four objects shown in the labeled rectangles at the top of each vertical axes, namely: the customer, the customer trading system, the online trading server and the provider trading system. The entire sequence of ordered gestures (messages) in any single diagram represents a workflow for the protocol.

The Quote Part

Figure 2B:
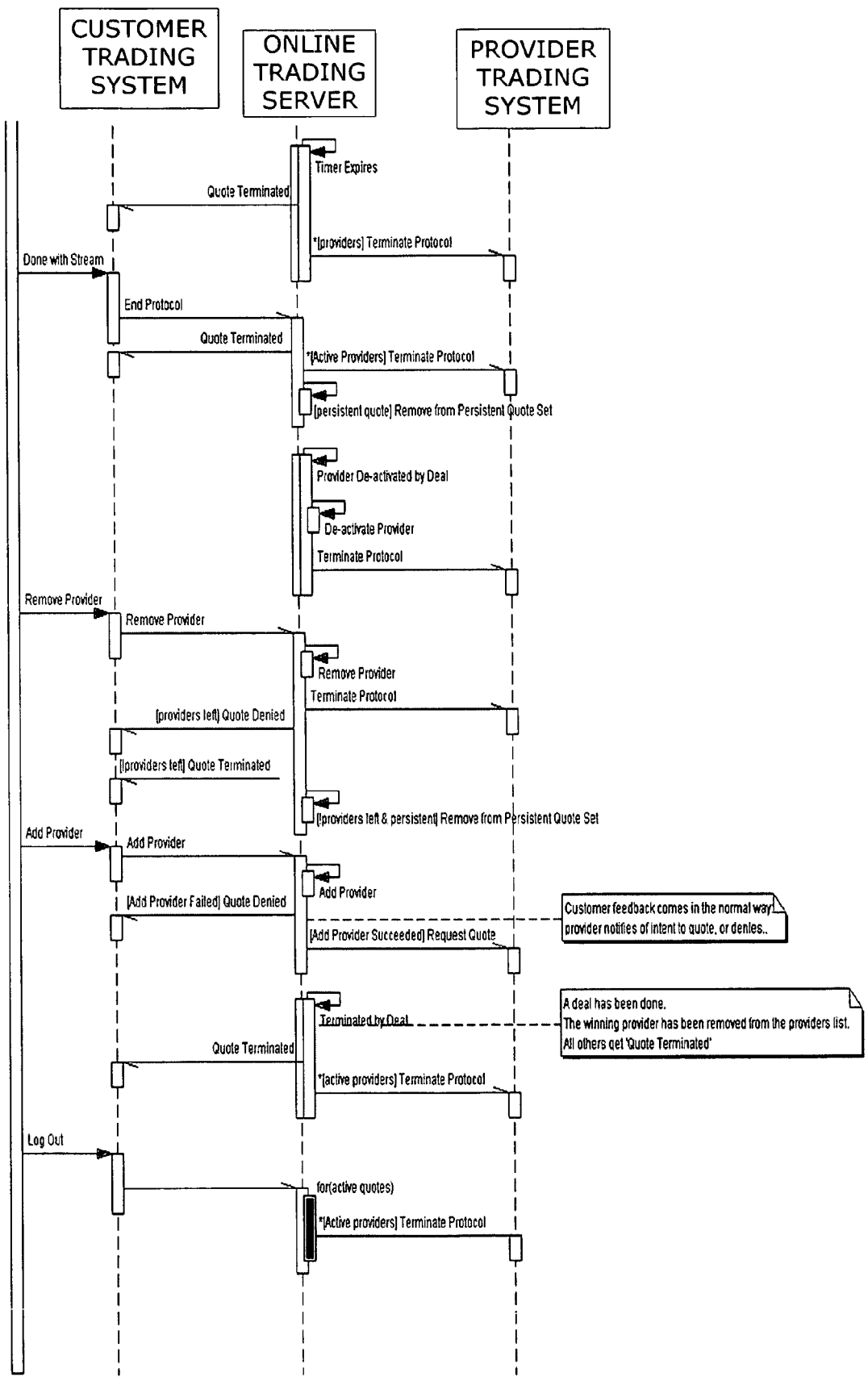

The UML sequence diagram shown in FIGS. 2A and 2B illustrates the sequence of protocol-independent gestures that may be assembled in embodiments of the invention to implement a trading protocol workflow. As shown in FIGS. 2A and 2B, the quote part is normally associated with a number of different providers. The initial set of providers is created when the customer starts the quote part. Providers can remove themselves from the quoting process (by refusing to send a quote to the customer), be removed individually by the customer or be removed by the customer when they are selected as the winning provider (depending on the protocol). If the number of providers on a quote is smaller than the permitted maximum, additional providers may be added to a pending or "in-flight" quote by a customer's request. When there are no providers remaining on the quote, it terminates and the customer is notified.

Certain quote parts are designated as persistent and may be restarted. This facility generally only applies to non time-limited quote parts, such as those that would be used in a QuickFill protocol transaction (described below). The providers and terms for the quote part are stored persistently at the server and may be re-submitted to the providers after a previous termination. In preferred embodiments, the termination of a quote part by a provider or by the server always results in a 'Quote Terminated' gesture to the customer. This applies even when the quote termination is a consequence of the customer completing a trade. This keeps the quote part clean and separate from the trading parts.

The Trade Part

The main differences between trading protocols (apart from the presence or absence of a quote part) arise from the behavior of the trade (or "negotiation") part of the protocol. The actions taken by the customer and provider are extremely similar in most trading protocols. The differences perceived by the parties are due to differences in the actions of the online trading server's trading engine as the parties to the transaction make decisions. Typically, these actions are derived from a very small set of possibilities, as illustrated in Table 1 below:

TABLE 1

| Online Trading Server (Trading Engine) Actions |
| --- |
| Log requested action |
| De-activate a provider in the quote part |
| terminate the quote part |
| pass on a counterparty's gesture |
| time-out a pending trade |

The following sections discuss examples of the trade parts of certain protocols that may be implemented with the invention.

The RFQ Protocol

In the classic RFQ protocol, there is a quote part and at most one trade part. The quote part is terminated when the server processes the customer's offer-to-deal. There is typically a timer on the duration of the quote part. If the provider has not responded by the end of the time out period, the customer is notified. The protocol does not terminate at this point; the provider may still generate a completion message (e.g., a "Refuse Terms" or "Deal Executed" message) that will be processed.

Figure 3:
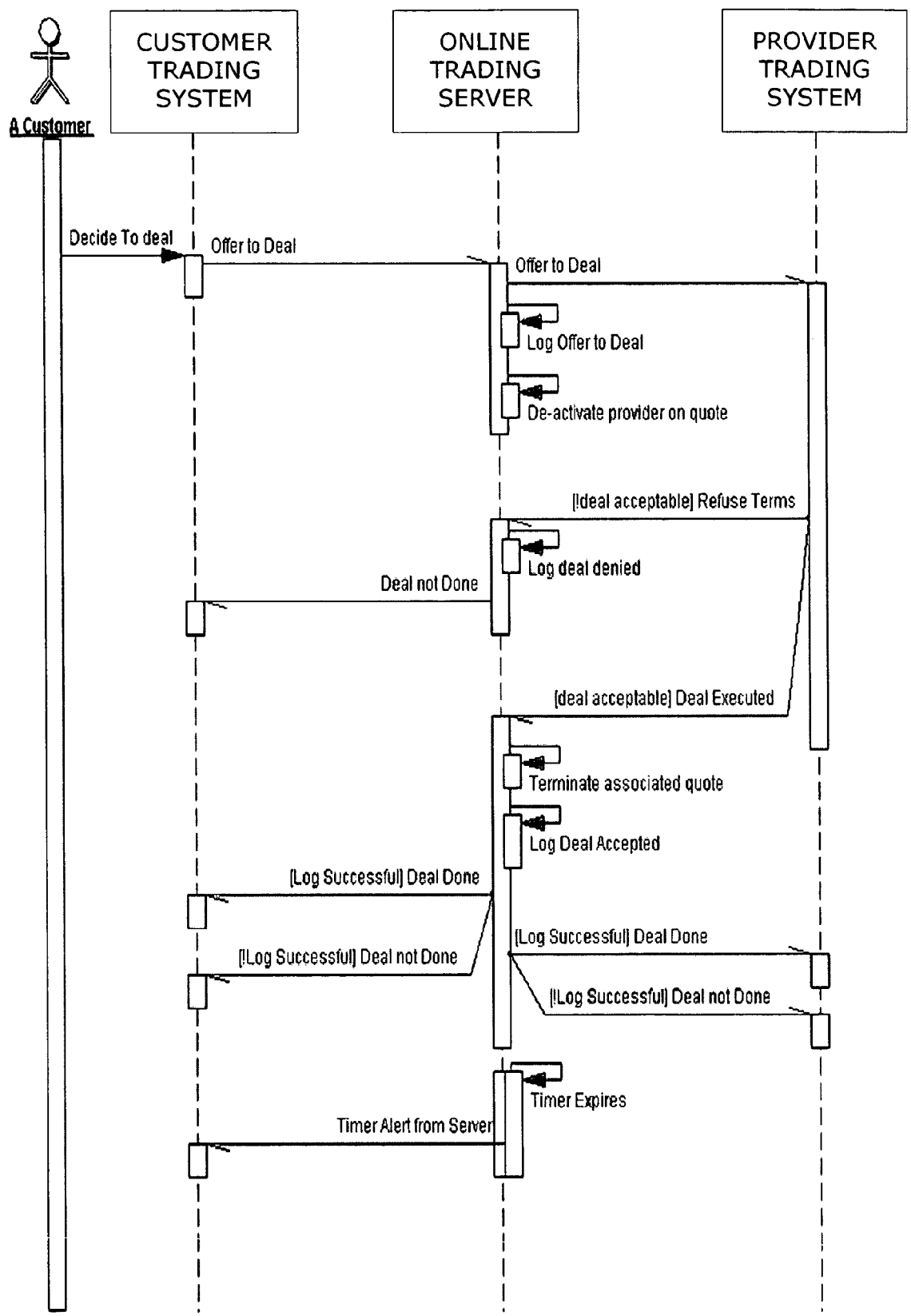

FIG. 3 contains a UML sequence diagram illustrating the sequence of protocol-independent gestures that may be used to implement the quote and trade parts of an RFQ protocol transaction according to embodiments of the present invention. Although the trade part is based on the classic RFQ protocol described above, the quote part is not terminated until a winning provider accepts the terms of the transaction. A provider selected in an Offer to Deal is immediately removed from the quote part and each provider has at most one chance to execute an RFQ deal (see the "De-activate provider on Quote" action and the "Terminate Associated Quote" gesture on the Online Trading Server axis of the sequence diagram in FIG. 3). The result is that a provider's Refuse Terms message does not prevent the customer from completing the trade unless the provider was the only provider in the quote part.

The QuickFill Protocol

The QuickFill protocol supports long-lived customer trading windows (or "panels") on the customer trading system showing streams of quotes from multiple providers in competition with each other to execute trades. The QuickFill streaming protocol, as well as a preferred user interface that may be used in conjunction with the protocol on a customer trading system, are components of the inventions disclosed and claimed in a co-pending application filed on even date herewith, entitled "QUICK-FILLING CUSTOMER ASSET TRADING SYSTEM" (Ser. No. 10/996,613), which is assigned to the assignee of the present application and incorporated in its entirety into this application by this reference.

With the QuickFill protocol, a customer can create many windows showing quote streams, although, in some embodiments of the invention, only one may exist for a single customer and currency pair. These windows present a non-disclosed model of trading where customers execute trades directly with providers (i.e., there is no intermediate trader, broker or trade manager). The non-disclosed model gives customers and providers the maximum possible privacy regarding the deals they complete.

The QuickFill protocol supports an 'end-to-end' relationship between providers and customers. A provider may have many simultaneous streams for quotes in the same currency pair to multiple customers. Providers retain complete control over customers' ability to obtain quotes (a stream can be unilaterally terminated by the provider at any time) and to complete deals (customer offers to deal can be rejected). Note that neither acceptance nor rejection of an individual offer-to-deal terminates the quote stream—the provider may continue to deliver quotes until the quote stream is explicitly terminated by the customer or the provider. Accordingly, the "De-activate provider on Quote" action and the "Terminate Associated Quote" gesture shown on the Online Trading Server axis of the sequence diagram in FIG. 3 does not appear on the Online Trading Server axis of FIG. 4)

When a customer establishes a stream of quotes, they provide a proposed set of terms. These terms will apply to all deals completed on the basis of the stream, with the exception of the deal size. The size that the customer presents when requesting the stream is the maximum order size. Deals done on the basis of the stream may have any size up to and including the maximum order size. Providers may deliver quotes of any size in response to a request specifying the QuickFill protocol. If the provider sends a quote with a larger size than the maximum order size, the online trading server may be configured to reduce the quote size to the maximum order size. Providers can vary the size quoted on each quote message. When a customer sends an offer to deal based on a quote in the stream, the maximum size they can offer is the smaller of their maximum order size and the size of the quote. They may offer a smaller size.

Figure 4:
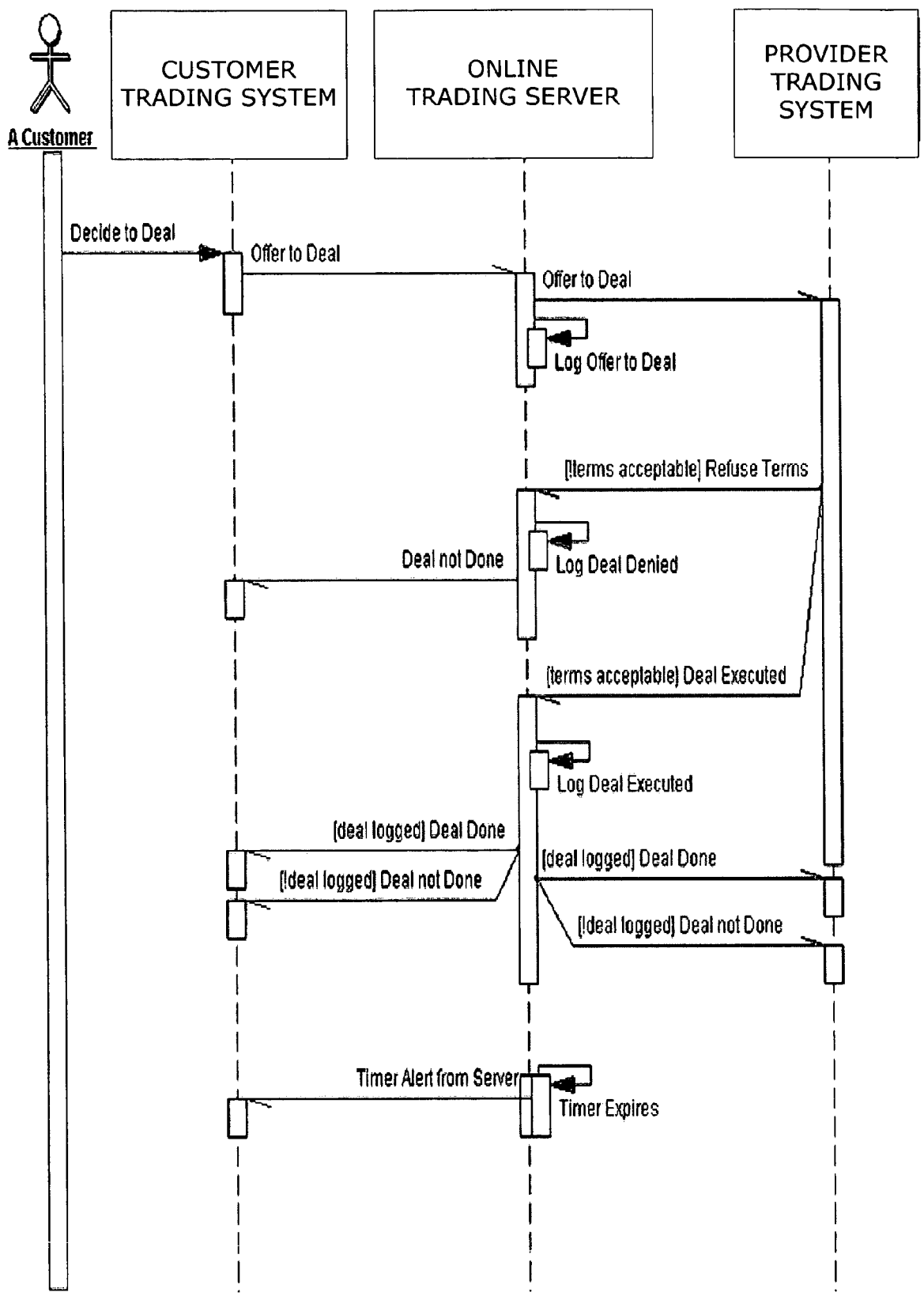

In preferred embodiments of the present invention, the QuickFill protocol consists of a quote part and one to many trade parts. Accordingly, there is a much weaker relationship between the quote and trade parts of this protocol than for the RFQ protocols, above. The trade part of this protocol is shown in the UML sequence diagram of FIG. 4. In the Quick Fill protocol, and as shown in FIG. 4, there is neither removal of providers nor termination of the quote part as a result of trading actions.

The Resting Order Protocol

Figure 5:
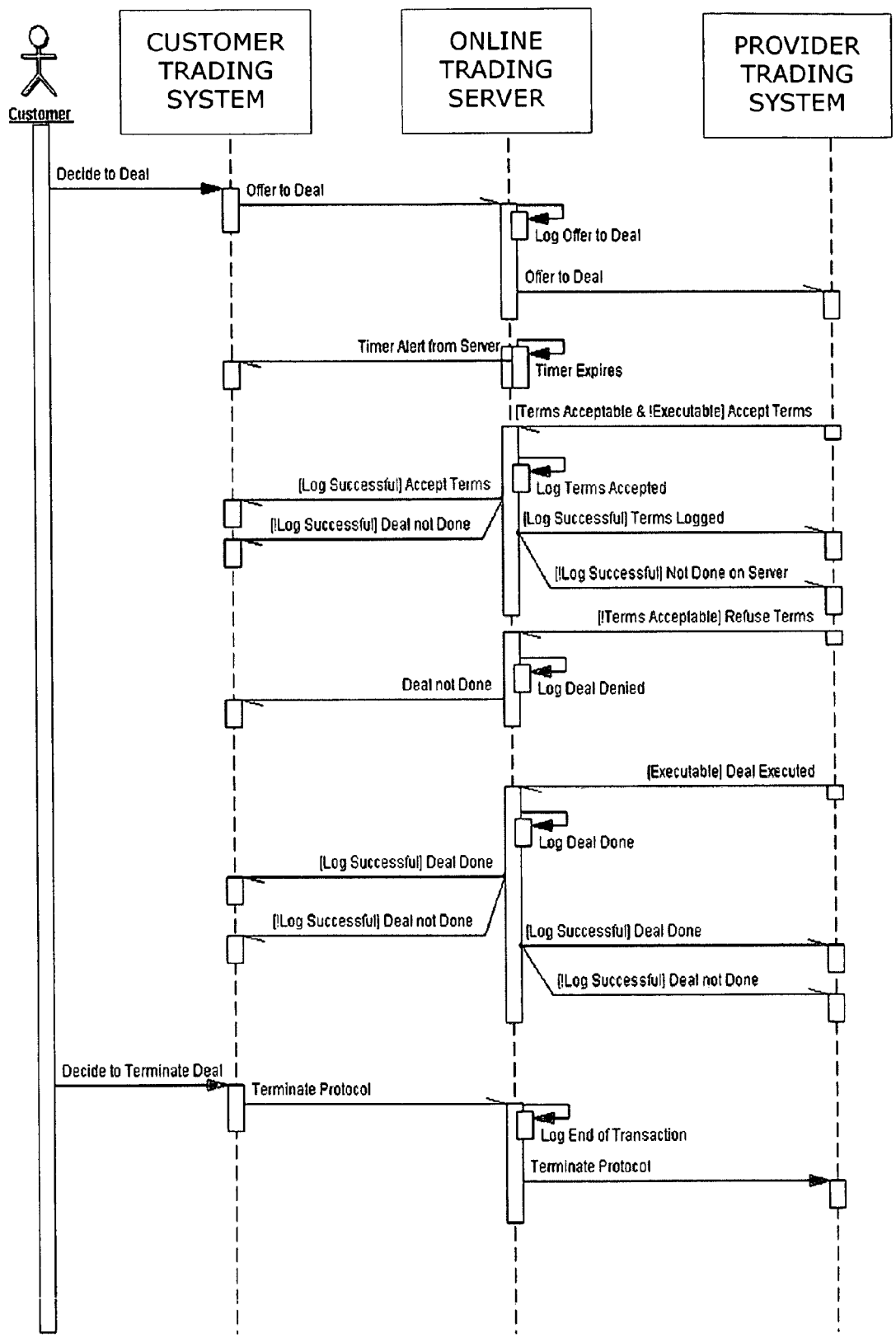

The resting order protocol offered by FXall consists of a trade part, without a quote part. FIG. 5 contains a UML sequence illustrating the timing and sequence of protocol independent gestures used to implement this protocol. As shown in FIG. 5, the protocol is started by the customer's submission of the full terms of a trade. This is logged in the server and delivered to the provider (only one can be specified). The provider responds quickly in one of three ways: by rejecting the order, executing the order, or by accepting the terms of the order for later execution. There is typically a timer alert on this protocol, but only until this initial response is received from the provider. From this point forward an order that was accepted, but not executed may 'rest' with the provider for a long time. In the resting order protocol, customers may cancel an outstanding order. In the other protocols, an order is expected to be filled immediately and there is no time for the customer to withdraw a deal request.

Operation of the Online Trading Server

An online trading server configured to operate according to the present invention has a network interface, a memory storage area (such as a database), a trading engine comprising a state machine processor and a collection of state transition rules. The network interface, which is connected to the same computer network as the customer trading system and the provider trading system, is configured to receive from the customer trading system a request to process a quote or trade according to a particular protocol and to send that request to the provider trading system. The online trading server also stores a current state for the quote or trade in the memory storage area. If the customer trading system sends a request for quotes under the RFQ protocol, for example, then initial current state stored by the online trading server for the quote would be the "Quoting" state.

The provider trading application on the provider trading system receives the request from the online trading server and creates a defined sequence of protocol-independent gestures for the quote or trade (according to a protocol-dependent workflow). Then the provider trading application successively sends each protocol-independent gesture in the defined sequence back to the online trading server via the network interface by executing a series of gestures (i.e., API calls) selected from the catalog of gestures shown in FIG. 1.

A trading engine on the online trading server receives each one of the protocol independent gestures from the provider trading application and, in response, modifies the memory storage area (if necessary) to reflect a new state for the quote or trade. The new state is determined based on the current state, the protocol-independent gesture received and a state transition rule selected from the collection of state transition rules, each of which identifies a new state that follows from receiving a valid protocol-independent gesture from a provider or customer trading system. In preferred embodiments, the trading engine includes a state machine processor (e.g., a computer microprocessor) programmed to select the appropriate state transition rule from the collection of state transition rules. The collection of state transition rules may be physically stored in the memory storage area or database designed for this purpose or hard coded directly into the state machine processor. In preferred embodiments, the collection is stored separately in order to support adding new state transition rules to the online trading server (to support new protocols) without having to change out or modify the state machine processor. Notably, not all protocol-independent gestures results in a change of state. As shown in some of the state diagrams discussed below, some of protocol independent gestures will have no effect on the current state of the quote or trade.

State Transition Rules

Figure 6:
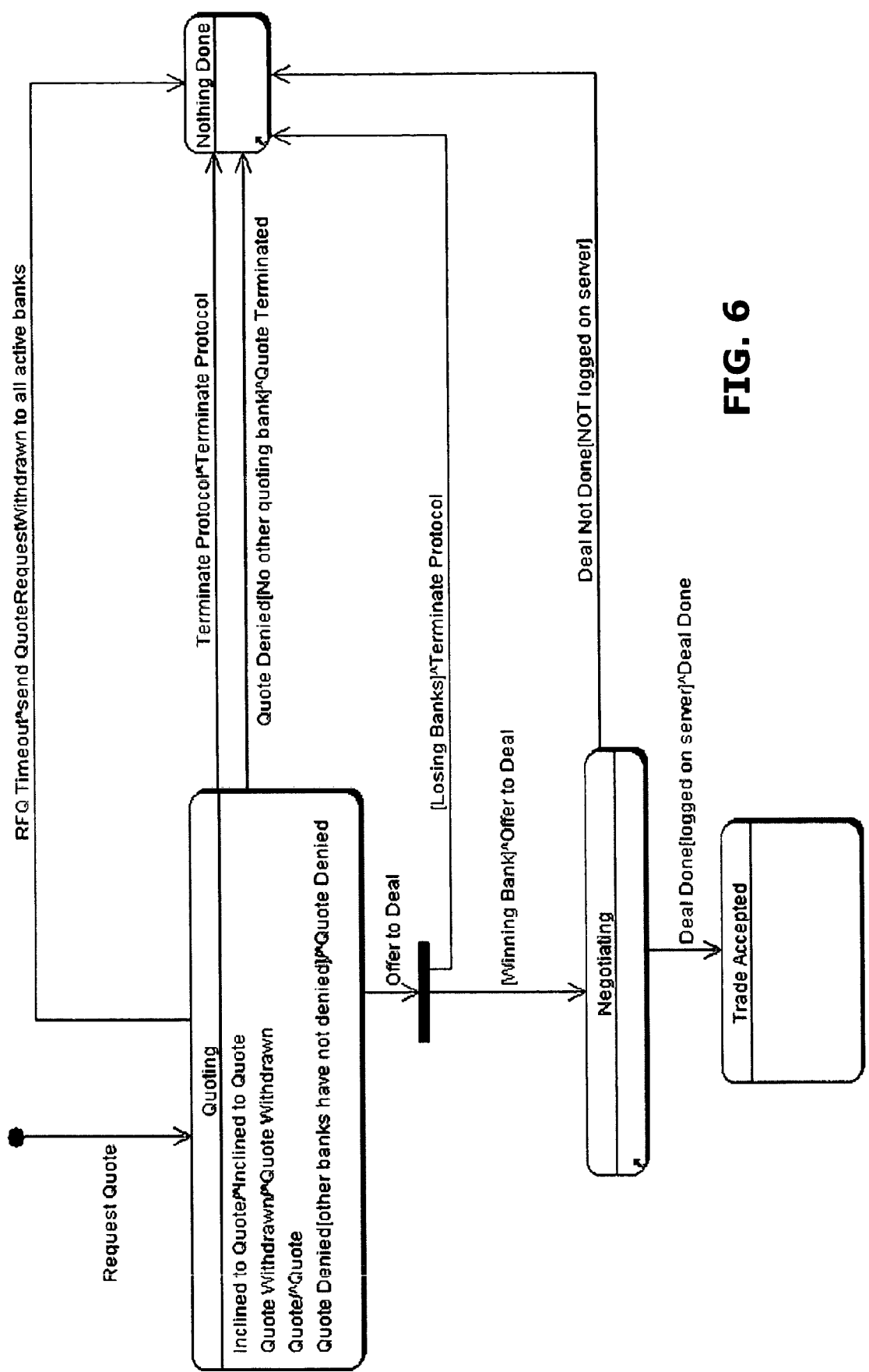
FIGS. 6, 7 and 8 contain unified modeling language (UML) state diagrams showing, from the perspective of the online trading server, the various states, state transitions and protocol-independent gestures for quotes and trades as they might be processed in an embodiment of the invention to implement the RFQ, QuickFill and resting order trading protocols, respectively.
Figure 7:
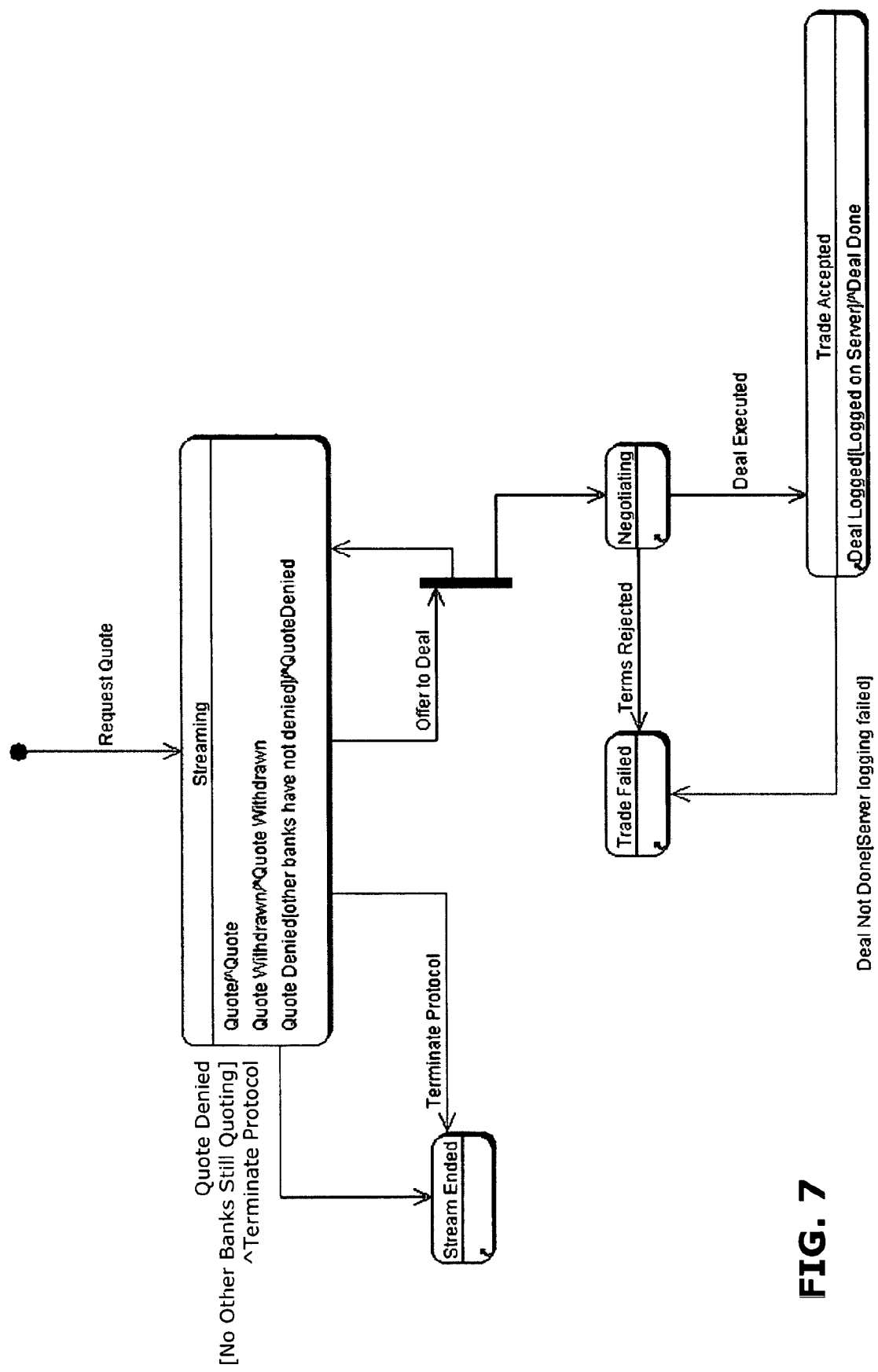
Figure 8:
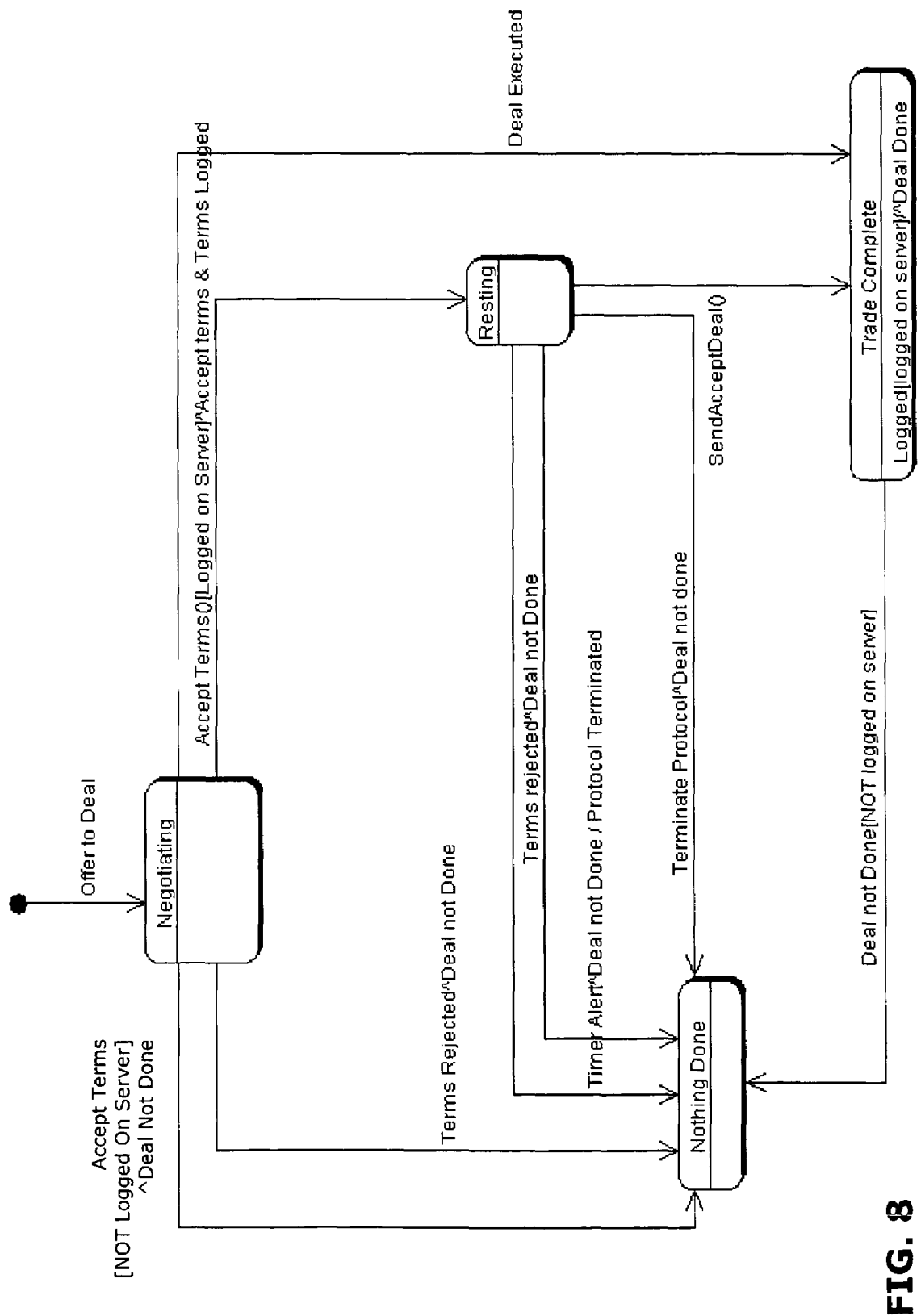

FIGS. 6, 7 and 8 contain UML state diagrams illustrating the various states, state transitions and protocol-independent gestures that an online trading server configured to operate according to the principles of the present invention may use to process a quote or trade under the RFQ, QuickFill and Resting Order protocols, respectively. In some of these state diagrams, the term "bank" is used instead of the term "provider," but these terms should be considered to be interchangeable with each other For purposes of the UML state diagrams, a labeled rectangular box with rounded corners represents a particular state. Inside each state box (below the state name or label) there is provided a list of protocol-independent gestures or activities associated with the current state, but which typically do not lead to a changing of the current state to a new state. Lines with arrows connect the state boxes, showing what possible state transitions can occur upon the receipt of a protocol-independent gesture. Each line and arrow leading into one box or leading from one box to another is annotated to show the gesture that must be received in order for an indicated state to be entered or for a particular transition to occur.

The syntax for these annotations, which has potentially up to three parts, is as follows: Gesture [Guard]^Response. The "gesture" in the line annotation shows the valid protocol-independent gesture, such as for example one of the provider and customer protocol-independent gestures shown in the tables of FIG. 1, which caused the state transition to occur. If there is a "guard" in the line annotation between two states, then the guard performs state transition control logic. When a guard is indicated next to a transition line, the state transition cannot occur unless the guard expression is true. When the gesture and optional guard are followed by the carat symbol ("^") and a "response," this indicates what additional action is taken by the online trading server (besides changing the state) in response to receiving the gesture. One such action, of course, is to generate and send back to the party that sent the gesture to the online trading server some kind of acknowledgement, confirmation or error message. In some cases, a single arrowed line leads to a thick bar, which then has two arrowed lines leading from it. This represents a processing branch or "fork," meaning that two processes or activities are taking place at the same time. Where two arrowed lines lead to a thick bar, which then has a single arrowed line leading from it, this means two processes will merge into a single process or activity.

Using this syntax, it can seen in FIG. 6, for example, that if the current state of a quote or trade is "Quoting," and the online trading server receives an "Inclined to Quote" gesture from the provider trading system, then the online trading server will respond by sending out an "Inclined to Quote" gesture (to the customer trading system). However, the server's receipt of the "Inclined To Quote" gesture from the provider trading system will not change the current state. So the transaction remains in the "Quoting" state. On the other hand, if the server receives an "Offer to Deal" gesture from a customer trading system while the transaction is in the "Quoting" state, and there is a "Winning Bank," then the online trading server sends an "Offer to Deal" gesture to the winning bank and changes the current state to "Negotiating." If there are "Losing Banks," then the online trading server also sends a "Terminate Protocol" gesture to those losing banks.

The UML sequence and state diagrams contained in FIGS. 2A-8 and discussed above are provided in order to show, by way of example only, the various types of protocol-dependent workflows and state transitions that may be used in embodiments of the present invention. It will be apparent to those skilled in the art, upon reading this disclosure, that many other workflows and state transitions, in addition to or as alternatives to those discussed herein, may be used to achieve substantial benefits without departing from the scope of the invention here described. Indeed, the ability to add or modify workflows and state transitions in systems operating according these principles is one of the invention's significant advantages.

Figure 9:
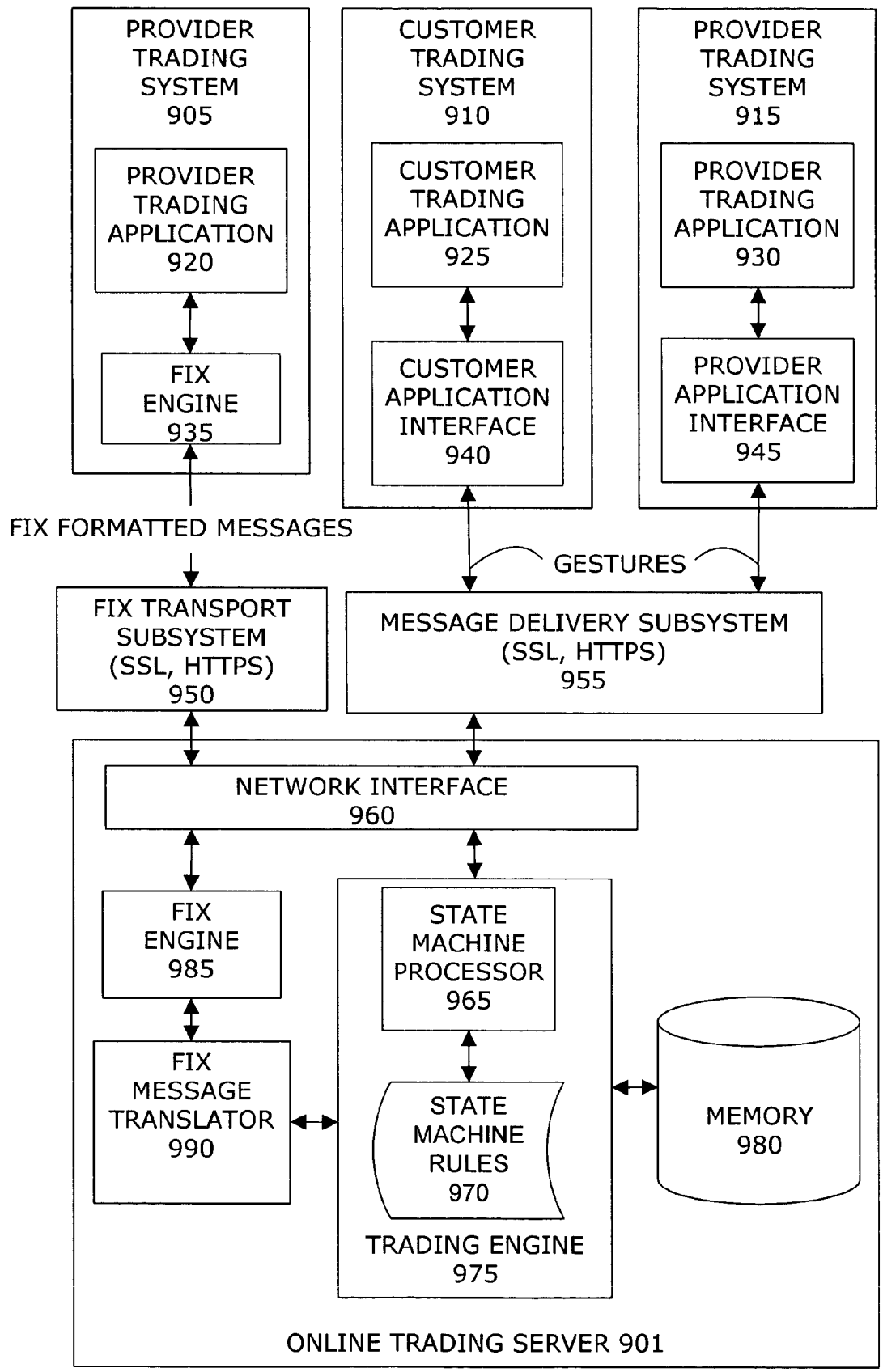
FIG. 9 contains a high-level block diagram illustrating the major functional components of a computer network configured to operate according to an embodiment of the invention.

FIG. 9 contains a high-level block diagram showing a computer network configured to operate according to an embodiment of the invention. As shown in FIG. 9, the computer network includes an online trading server 901, a customer trading system 910 and a provider trading system 915, which are communicatively connected to each other via a message deliver subsystem 955 (such as a direct secured sockets layer (SSL) connection or an https tunneling connection over the World Wide Web). In a typical scenario, customer trading system 910 includes a customer trading application 925 (which itself may include a graphical user interface) that is configured to accept trading transaction requests from users to process quotes and trades according to a particular protocol. Customer trading application 925 is configured to know, derive or retrieve a protocol-dependent workflow for the requested protocol and to select and assemble a sequence of protocol-independent customer gestures to model the protocol-dependent workflow. The protocol-independent customer gestures may be selected, for example, from the catalog of gestures shown in the table on the right side of FIG. 1. Customer trading application 925 then sends the protocol-independent gestures to online trading server 901 by invoking a series of API library function calls made available by the inclusion of customer application interface 940. Preferably, the API library also includes function calls configured to handle any network connection issues for communication over the message delivery subsystem 955.

Online trading server 901 has a network interface 960, which may comprise, for example, any wired or wireless network interface adapter, and which receives each protocol-independent gesture from customer trading application 925. Online trading server 901 also has a trading engine 975 and a memory 980. Upon receiving the transaction request, online trading server 901 stores a current state for the transaction in memory 980, which is configured to hold the status of pending quotes and trades. Online trading server 901 then generates its own protocol-independent gestures to represent the transaction request, and sends that protocol-independent gesture to provider trading system 915.

Provider trading system 915 also has an API library of function calls, shown as provider application interface 945 in FIG. 9, which is configured to receive protocol-independent gestures from online trading server 901 and pass them to provider trading application 930. Similar to customer trading application 925, provider trading application 930 is configured to know, derive or retrieve a protocol-dependent workflow for the requested protocol, to select and assemble a sequence of protocol-independent provider gestures to model the protocol-dependent workflow, and to send these provider gestures back to online trading server 901 in the order defined by the modeled workflow. In this case, the protocol-independent provider gestures may be selected, for example, from the catalog of gestures shown in the table on the left side of FIG. 1.

Trading engine 975 on online trading server 901 includes a state machine processor 965, which determines, based on the current state, the protocol-independent gesture received, and a state transition rule retrieved from a collection of state machine rules 970, whether to change the current state of the quote or trade in the transaction to a new state. If so, then online trading engine 975 makes the appropriate modification to memory 980 to update the current state, and typically sends a notification to customer trading system 910, provider trading system 915, or both of them, by means of return protocol-independent gesture.

Online trading server 901 optionally includes a fix engine 985 and fix message translator 990, which are configured to receive and translate messages formatted and transmitted to online trading server 901 according to the Financial Information exchange (FIX) communications standard. The FIX messaging standard, which can found on the Internet at www.fix-protocol.org, is a series of messaging specifications developed through the collaboration of banks, broker-dealers, exchanges, industry utilities and associations, institutional investors, and information technology providers from around the world. If these FIX components are included, then online trading server 901 may be programmed to process, in a protocol-independent fashion, trading requests received from provider trading system 905, which itself uses a protocol-aware provider trading application 920 similar to customer trading application 925 and provider trading application 930. Thus, provider trading application 920 is configured to assemble a sequence of protocol-independent gestures to form a protocol-dependent workflow and deliver the protocol-independent messages to fix engine 935, where they are converted to or encapsulated in data packets conforming to the FIX format, and then transmitted to online trading server 901 via fix transport subsystem 950. Typically, although not necessarily, fix transport subsystem 950, like message delivery subsystem 955, comprises data communications links through public networks, such as the Internet. Indeed, although not illustrated in FIG. 9, fix transport subsystem 950 and message delivery subsystem 955 may in fact constitute the same computer network.

Figure 10:
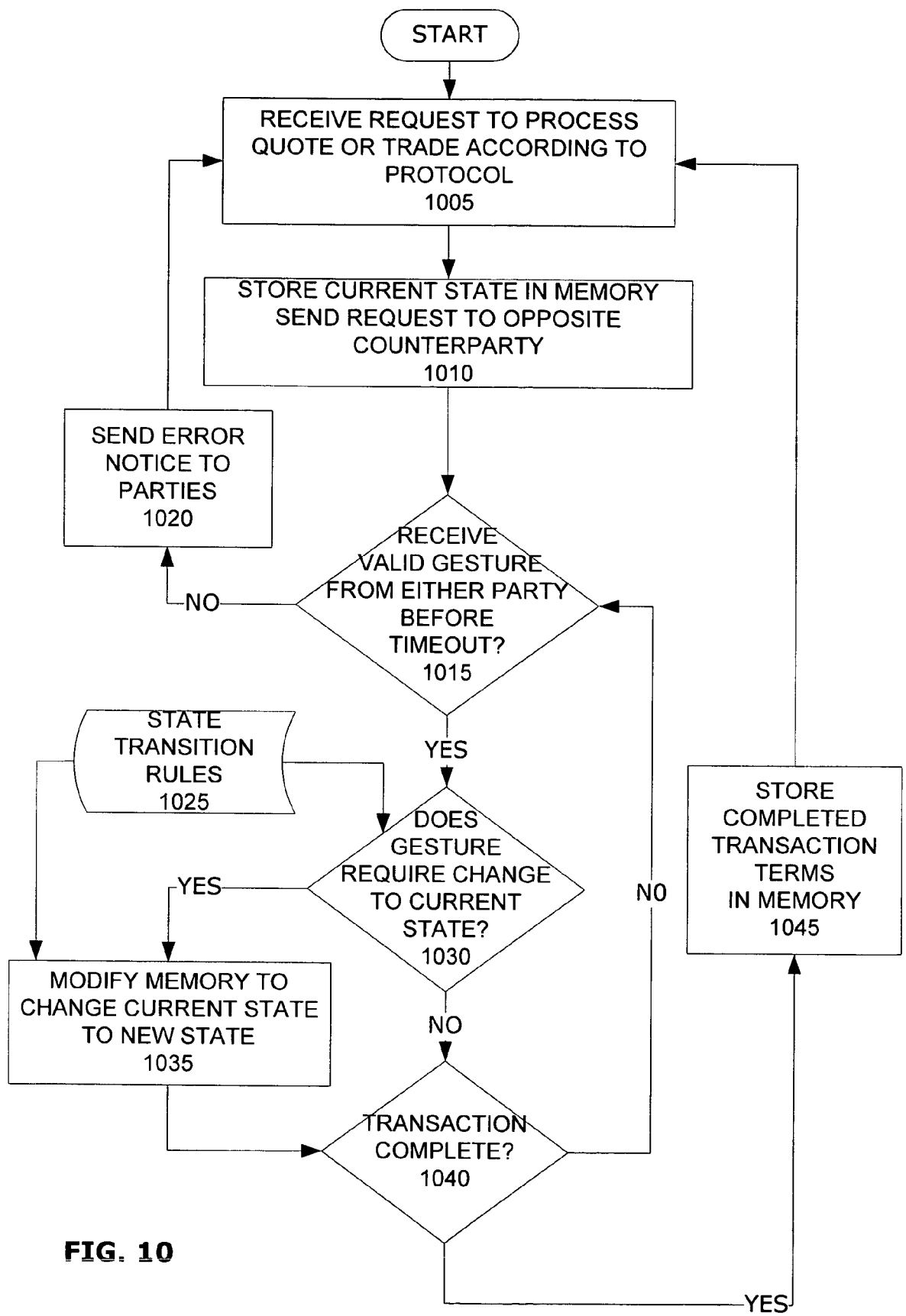
FIG. 10 contains a high-level flow diagram illustrating the steps that might be performed in an online trading server configured to operate according to an embodiment of the invention, such as, for example, the online trading server depicted in FIG. 9.

FIG. 10 contains a high-level flow diagram illustrating the steps that might be performed by an online trading server configured to operate according to embodiments of the invention., such as online trading server 901 in FIG. 9. In the first step, step 1005, the online trading server receives a request to process a quote or trade according to a particular protocol. Next, the current state of the quote or trade is stored in memory on the online trading server, and the request is sent to an opposite counterparty (step 1010). The server then monitors incoming messages, at step 1015, to determine whether a valid protocol-independent gesture has been received before a specified time period expires. Timeouts may not be applicable for some long-lived protocols, such as QuickFill. If a timeout is applicable and no gesture is received before the timeout period expires, or if the gesture received is invalid, then the server sends error messages to the parties (step 1020).

If the server does receive a valid gesture at step 1015, then a state machine processor on the server determines, by reference to a collection of state transition rules 1025, whether a state change is required (step 1030). If a state change is required, the memory area containing the current state is modified (at step 1035) to change the current state to the new state dictated by the state transition rules 1025. If no change in state is required, the processing continues at step 1040, where the server determines whether the transaction is complete. In preferred embodiments, the online trading server includes another memory area, such as a database, which is configured to store the economic terms of completed transactions, as opposed to transactions that are still pending. In such embodiments, the online trading server may be configured to update this completed transactions database (step 1045) prior to returning to step 1005, where the process starts all over again.

The present invention has been disclosed and described herein in what is considered to be its most preferred embodiments. It should be noted that variations and equivalents may occur to those skilled in the art upon reading the present disclosure and that such variations and equivalents are intended to come within the scope of the invention and the appended claims. Therefore, for example, it should be understood by one skilled in the art that the present invention is not limited to foreign exchange transactions, and may be beneficially applied to other types of transactions as described above.

What is claimed is:

1. A computer network for processing trading transactions, comprising:

a customer trading system comprising a customer trading application;

a provider trading system comprising a provider trading application;

an online trading server comprising a state machine processor, a collection of state transition rules and a memory;

a first data communications link connecting said online trading server to said customer trading system; and a second data communications link connecting said online trading server to said provider trading system;

wherein said online trading server receives, via said first data communications link, a request from said customer trading system to process a quote or trade, said processing to be carried out according to a particular trading protocol, stores a current state for said quote or trade in said memory, and sends said request to said provider trading system via said second data communications link, said provider trading application creates a defined sequence of protocol-independent gestures, the defined sequence being arranged to model a protocol-dependent workflow for said particular trading protocol, and serially transmits each protocol-independent gesture in said defined sequence to said online trading server, and in response to receiving said each protocol-independent gesture in said defined sequence, said state machine processor modifies said memory to reflect a new state for said quote or trade, said new state being determined based on said current state, said each protocol-independent gesture received and a state transition rule retrieved from said collection of state transition rules;

whereby the state machine processor transitions the quote or trade through a series of distinct states to carry out the protocol-dependent workflow in a manner that does not require the state machine processor to know the protocol-dependent workflow for the particular trading protocol.

2. The computer network of claim 1, wherein said new state and said current state are the same.

3. The computer network of claim 1, wherein said online trading server is configured:

to generate a return protocol-independent gesture based on said state transition rule and said each protocol-independent gesture received; and transmit said return protocol-independent gesture to said provider trading system.

4. The computer network of claim 1, wherein said provider trading application creates said defined sequence by:

selecting one or more protocol-independent gestures from a catalog of protocol-independent gestures, each protocol-independent gesture in said catalog comprising a fundamental asset trading message that supports said particular trading protocol; and arranging said selected one or more protocol-independent gestures into said defined sequence.

5. The computer network of claim 1, wherein said provider trading system further comprises a provider application interface, coupled to said provider trading application and said second data communications link, which transmits said defined sequence of protocol-independent gestures to said online trading server.

6. The computer network of claim 1, wherein:

said customer trading application creates a second defined sequence of protocol-independent gestures, the second defined sequence being arranged to model a second protocol-dependent workflow for said particular trading protocol, and serially transmits each protocol-independent gesture in said second defined sequence to said online trading server, and said state machine processor, in response to receiving said each protocol-independent gesture in said second defined sequence, modifies said memory to reflect a second new state for said quote or trade, said second new state being determined based on said current state, said each protocol-independent gesture in said second defined sequence received and a second state transition rule retrieved from said collection of state transition rules.

7. The computer network of claim 6, wherein said customer trading application creates said second defined sequence by:

selecting one or more protocol-independent customer gestures from a catalog of protocol-independent customer gestures, each protocol-independent customer gesture in said catalog comprising a fundamental asset trading message that supports said particular trading protocol; and arranging said selected one or more protocol-independent customer gestures into said second defined sequence.

8. The computer network of claim 7, wherein said customer trading system further comprises a customer application interface, coupled to said customer trading application and said second data communications link, which transmits said second defined sequence of protocol-independent customer gestures to said online trading server.

9. The computer network of claim 1, wherein each state transition rule in said collection is configured to identify a state that follows from receiving at least one of said each protocol-independent gestures in said defined sequence.

10. The computer network of claim 1, wherein said first data communications link comprises a message delivery subsystem.

11. The computer network of claim 1, wherein said second data communications link comprises a message delivery subsystem.

12. The computer network of claim 1, wherein said provider trading system further comprises a financial information exchange engine, coupled to said provider trading application and said second data communications link, which converts said defined sequence of protocol-independent gestures into a series of financial information exchange messages and transmits said financial information exchange messages to said online trading server via said second data communications link.

13. The computer network of claim 12, wherein said second data communications link comprises financial information exchange transport subsystem.

14. The computer network of claim 13, wherein said online trading server further comprises:

a second financial information exchange engine, coupled to said second data communications link, which receives said series of financial information exchange messages from said provider trading system; and a financial information exchange message translator that which converts said series of financial information exchange messages into said defined sequence of protocol-independent gestures.

15. An online trading server, comprising:

a network interface configured to receive from a customer trading system a request to process a quote or trade, said processing to be carried out according to a particular trading protocol, and to send said request to a provider trading system;

a memory configured to store a current state for said quote or trade; and a state machine processor that receives from said provider trading system, via said network interface, a defined sequence of protocol-independent gestures, the defined sequence being arranged to model a protocol-dependent workflow for said particular trading protocol, and in response to receiving each protocol-independent gesture in said defined sequence, modifies said memory to reflect a new state for said quote or trade;

wherein said new state is determined based on said current state, said each protocol-independent gesture received and a state transition rule;

whereby the state machine processor transitions the quote or trade through a series of distinct states to carry out the protocol-dependent workflow in a manner that does not require the state machine processor to know the protocol-dependent workflow for the particular trading protocol.

16. The online trading server of claim 15, further comprising:

a collection of state transition rules, each state transition rule in said collection being configured to identify a state that follows from receiving at least one of said each protocol-independent gestures in said defined sequence;

wherein said state machine processor retrieves said state transition rule from said collection.

17. The online trading server of claim 15, wherein said new state and said current state are the same.

18. The online trading server of claim 15, wherein said trading engine is configured:
to generate a return protocol-independent gesture responsive to said each protocol-independent gesture received; and
transmit said return protocol-independent gesture to said provider trading system via said network interface.

19. In a computer network comprising a provider trading system and an online trading server having a state machine processor, a method of processing trading transactions, comprising:
receiving at said online trading server a request from a customer trading system to process a quote or trade, said processing to be carried out according to a particular trading protocol;
storing a current state for said quote or trade in a memory at said online trading server;
sending said request to said provider trading system;
on said provider trading system, creating a defined sequence of protocol-independent gestures, the defined sequence being arranged to model a protocol-dependent workflow for said particular trading protocol;
serially transmitting each protocol-independent gesture in said defined sequence from said provider trading system to said online trading server; and
on said online trading server, in response to receiving said each protocol-independent gesture in said defined sequence, causing the state machine processor to modify said memory to reflect a new state for said quote or trade, said new state being determined based on said current state, said each protocol-independent gesture received and a state transition rule;
thereby causing the state machine processor to transition the quote or trade through a series of distinct states to carry out the protocol-dependent workflow on said online trading server in a manner that does not require said state machine processor to know the protocol-dependent workflow for said particular trading protocol.

20. The method of claim 19, further comprising defining a catalog of protocol-independent gestures, each protocol-independent gesture in said catalog comprising a fundamental asset trading message that supports a multiplicity of trading protocols.

21. The method of claim 20, further comprising creating said defined sequence by:
selecting one or more protocol-independent gestures from said catalog which support said particular trading protocol; and
arranging said selected one or more protocol-independent gestures into said defined sequence.

22. The method of claim 19, further comprising:
storing on said online trading server a collection of state transition rules, each state transition rule in said collection being configured to identify a state that follows from receiving one of said each protocol-independent gestures in said defined sequence; and
retrieving said state transition rule from said collection.

23. The method of claim 19, wherein said new state and said current state are the same.

24. The method of claim 19, further comprising:
generating a return protocol-independent gesture based on said each protocol-independent gesture received and said state transition rule; and transmitting said return protocol-independent gesture to said provider trading system.

25. In a computer network comprising a customer trading system and an online trading server having a state machine processor, a method of processing trading transactions, comprising:
receiving at said online trading server a request from said customer trading system to process a quote or trade, said processing to be carried out according to a particular trading protocol;
storing a current state for said quote or trade in a memory at said online trading server;
sending said request to a provider trading system;
on said customer trading system, creating a defined sequence of protocol-independent gestures, the defined sequence being arranged to model a protocol-dependent workflow for said particular trading protocol;
serially transmitting each protocol-independent gesture in said defined sequence from said customer trading system to said online trading server; and
on said online trading server, in response to receiving said each protocol-independent gesture in said defined sequence, causing the state machine processor to modify said memory to reflect a new state for said quote or trade, said new state being determined based on said current state, said each protocol-independent gesture received and a state transition rule;
thereby causing the state machine processor to transition the quote or trade through a series of distinct states to carry out the protocol-dependent workflow on said online trading server in a manner that does not require the state machine processor to know the protocol-dependent workflow for the particular trading protocol.

26. The method of claim 25, further comprising defining a catalog of protocol-independent gestures, each protocol-independent gesture in said catalog comprising a fundamental asset trading message that supports a multiplicity of trading protocols.

27. The method of claim 26, further comprising creating said defined sequence by:
selecting one or more protocol-independent gestures from said catalog which support said particular trading protocol; and
arranging said selected one or more protocol-independent gestures into said defined sequence.

28. The method of claim 25, further comprising:
storing on said online trading server a collection of state transition rules, each state transition rule in said collection being configured to identify a state that follows from receiving at least one of said each protocol-independent gestures in said defined sequence; and
retrieving said state transition rule from said collection.

29. The method of claim 25, wherein said new state and said current state are the same.

30. The method of claim 25, further comprising:
generating a return protocol-independent gesture said each protocol-independent gesture received and the state transition rule; and
transmitting said return protocol-independent gesture to said customer trading system.

31. A method of processing trading transactions on an online trading server having a state machine processor, comprising:
on said online trading server, receiving from a customer trading system, via a network interface, a request to process a quote or trade, said processing to be carried out according to a particular trading protocol;

on said online trading server, storing a current state for said quote or trade in a memory;

sending said request to a provider trading system via said network interface;

on said online trading server, receiving from said provider trading system, via said network interface, a defined sequence of protocol-independent gestures, the defined sequence being arranged to model a protocol-dependent workflow for said particular trading protocol; and on said online trading server, in response to receiving each protocol-independent gesture in said defined sequence, causing said state machine processor to modify said memory to reflect a new state for said quote or trade, said new state being determined based on said current state, said each protocol-independent gesture received and a state transition rule;

thereby causing the state machine processor to transition the quote or trade through a series of distinct states to carry out the protocol-dependent workflow on said online trading server in a manner that does not require the state machine processor to know the protocol-dependent workflow for the particular trading protocol.

32. The method of claim 31, further comprising:

storing a collection of state transition rules, each state transition rule in said collection being configured to identify a state that follows from receiving at least one of said each protocol-independent gestures in said defined sequence; and retrieving said state transition rule from said collection.

33. The method of claim 31, wherein said new state and said current state are the same.

34. The method of claim 31, further comprising:

generating a return protocol-independent gesture based on said each protocol-independent gesture received and the state transition rule; and transmitting said return protocol-independent gesture to said customer trading system.

35. The method of claim 31, further comprising:

generating a return protocol-independent gesture based on said each protocol-independent gesture received and the state transition rule; and transmitting said return protocol-independent gesture to said provider trading system.

36. A method of processing trading transactions on an online trading server having a state machine processor, comprising:

receiving from a counterparty, via a network interface, a request to process a quote or trade, said processing to be carried out according to a particular trading protocol;

storing a current state for said quote or trade in a memory associated with said online trading server;

sending said request to an opposite counterparty via said network interface;

on said online trading server, receiving from said counterparty or said opposite counterparty or both a defined sequence of protocol-independent gestures, the defined sequence being arranged to model a protocol-dependent workflow for said particular trading protocol; and on said online trading server, in response to receiving each protocol-independent gesture in said defined sequence, causing said state machine processor to modify said memory to reflect a new state for said quote or trade, said new state being determined based on said current state, said each protocol-independent gesture received and a state transition rule;

thereby causing the state machine processor to transition the quote or trade through a series of distinct states to carry out the protocol-dependent workflow on said online trading server in a manner that does not require the state machine processor to know the protocol-dependent workflow for the particular trading protocol.

37. The method of claim 36, further comprising:

storing a collection of state transition rules, each state transition rule in said collection being configured to identify a state that follows from receiving at least one of said each protocol-independent gestures in said defined sequence; and retrieving said state transition rule from said collection.

38. The method of claim 36, wherein said new state and said current state are the same.

39. An online trading server, comprising:

request-receiving means for receiving from a counterparty a request to process a quote or trade, said processing to be carried out according to a particular trading protocol;

storage means, responsive to said request-receiving means, for storing a current state for said quote or trade;

transmission means for sending said request to an opposite counterparty;

gesture-receiving means for receiving from said counterparty or said opposite counterparty or both a defined sequence of protocol-independent gestures, the defined sequence being arranged to model a protocol-dependent workflow for said particular trading protocol; and state transition means for changing said current state to a new state based on said current state, each protocol-independent gesture in said defined sequence received, and a state transition rule;

whereby the state transition means transitions the quote or trade through a series of distinct states to carry out the protocol-dependent workflow in a manner that does not require the state transition means to know the protocol-dependent workflow for the particular trading protocol.

40. The online trading server of claim 39, wherein said state transmission means comprises a state machine processor.

41. The online trading server of claim 39, wherein said new state and said current state are the same.

42. The online trading server of claim 39, further comprising:

means for generating a return protocol-independent gesture responsive to said gesture-receiving means; and means for transmitting said return protocol-independent gesture to said counterparty.

43. The online trading server of claim 39, further comprising:

means for generating a return protocol-independent gesture responsive to said gesture-receiving means; and means for transmitting said return protocol-independent gesture to said opposite counterparty.

* * * * *